US012644853B2

(12) United States Patent
Chatterjee et al.

(10) Patent No.: US 12,644,853 B2
(45) Date of Patent: Jun. 2, 2026

(54) METHOD FOR DETERMINING A CHARGE-STATE BOUNDARY OF A QUANTUM DOT, A MULTI-DOT DEVICE, OR AN ARRAY OF QUANTUM DOTS AND A DATA PROCESSING SYSTEM FOR PERFORMING THE METHOD

(71) Applicant: University of Copenhagen, Copenhagen K (DK)

(72) Inventors: Anasua Chatterjee, Copenhagen Ø (DK); Oswin Krause, Copenhagen Ø (DK); Ferdinand Kuemmeth, Copenhagen Ø (DK)

(73) Assignee: University of Copenhagen, Copenhagen (DK)

( * ) Notice: Subject to any disclaimer, the term of this patent is extended or adjusted under 35 U.S.C. 154(b) by 128 days.

(21) Appl. No.: 18/577,172

(22) PCT Filed: Jul. 6, 2022

(86) PCT No.: PCT/EP2022/068737

§ 371 (c)(1),
(2) Date: Jan. 5, 2024

(87) PCT Pub. No.: WO2023/280916

PCT Pub. Date: Jan. 12, 2023

(65) Prior Publication Data

US 2025/0044250 A1     Feb. 6, 2025

(30) Foreign Application Priority Data

Jul. 6, 2021     (EP) ..................................... 21183956

(51) Int. Cl.
*G01N 27/22* (2006.01)
*G06N 10/40* (2022.01)

(52) U.S. Cl.
CPC ............. *G01N 27/22* (2013.01); *G06N 10/40* (2022.01)

(58) Field of Classification Search
CPC ............................... G01N 27/22; G06N 10/40
See application file for complete search history.

(56) References Cited

U.S. PATENT DOCUMENTS 6,597,010 B2     7/2003   Eriksson et al.
7,135,697 B2     11/2006  Friesen et al.
         (Continued)

OTHER PUBLICATIONS

Volk et al., "Fast Charge Sensing of Si/SiGe Quantum Dots via a High-Frequency Accumulation Gate", Aug. 14, 2019, Nano Letters, vol. 19, No. 8, Aug. 14, 2019, pp. 5628-5633, XP055870568, US; ISSN: 1530-6984 (Year: 2019).*
         (Continued)

*Primary Examiner* — Akm Zakaria
(74) *Attorney, Agent, or Firm* — Cesari and McKenna, LLP

(57) ABSTRACT

Disclosed is a method for determining a charge-state boundary of a quantum dot, a multi-dot device, or an array of quantum dots, including the steps of defining an initial point inside a charge state of a quantum dot having a charge-state boundary, ramping gate voltages from the initial point thereby creating a plurality of rays in gate voltage space, creating a time stamp when each of the rays leave the charge-state/cross the charge-state boundary, and constructing the boundary of the charge state by correlating each ray in gate voltage space with the associated time stamp.

15 Claims, 7 Drawing Sheets

(56) References Cited

U.S. PATENT DOCUMENTS

| | | | |
|---|---|---|---|
| 7,354,809 | B2 | 4/2008 | Yuan et al. |
| 7,645,933 | B2 | 1/2010 | Narkis et al. |
| 7,776,642 | B2 | 8/2010 | Eriksson et al. |
| 7,812,353 | B2 | 10/2010 | Yuan et al. |
| 8,089,073 | B2 | 1/2012 | Evans et al. |
| 9,842,921 | B2 | 12/2017 | Eriksson et al. |
| 10,192,976 | B2 | 1/2019 | Petta et al. |
| 10,482,388 | B1 * | 11/2019 | Jock ..................... H10D 62/83 |
| 10,572,814 | B2 | 2/2020 | Friesen et al. |
| 10,872,956 | B2 | 12/2020 | Eendebak et al. |
| 10,978,578 | B2 | 4/2021 | Petta et al. |
| 11,038,021 | B2 | 6/2021 | Singh et al. |
| 11,063,138 | B2 | 7/2021 | Singh et al. |
| 11,121,239 | B2 | 9/2021 | Petta et al. |
| 11,133,388 | B1 | 9/2021 | Joynt et al. |
| 11,322,591 | B2 | 5/2022 | Singh et al. |
| 11,533,046 | B2 * | 12/2022 | Redmond .............. G06N 3/084 |
| 11,610,984 | B2 | 3/2023 | Petta et al. |
| 11,721,723 | B2 | 8/2023 | Singh et al. |
| 11,721,725 | B2 | 8/2023 | Singh et al. |
| 11,721,748 | B2 | 8/2023 | Singh et al. |
| 11,910,728 | B2 | 2/2024 | Petta et al. |
| 2006/0027275 | A1 | 2/2006 | Eriksson et al. |
| 2020/0127096 | A1 * | 4/2020 | Eendebak .......... G11C 16/0475 |
| 2022/0036227 | A1 * | 2/2022 | Karzig ................... G06N 10/00 |
| 2023/0036699 | A1 | 2/2023 | Van Diepen et al. |
| 2023/0274136 | A1 * | 8/2023 | Zwolak ................. G06N 10/40 |
| | | | 706/25 |

OTHER PUBLICATIONS

Takashi Nakajima et al., "Real-Time Feedback Control of Charge Sensing for Quantum Dot Qubits", Mar. 26, 2021, Phys. Rev. Applied 15, L031003—Published Mar. 26, 2021 DOI: https://doi.org/10.1103/PhysRevApplied.15.L031003 (Year: 2021).*
Agrawal et al., "A rewriting system for convex optimization problems", Journal of Control and Decision, 5, 42-60, 2018.
Ansaloni, Fabio, "Single-electron control in oneand two-dimensional arrays of silicon quantum dots", Dissertation, University of Copenhagen, 2020.
Barber et al., "The quickhull algorithm for convex hulls", ACM Transactions on Mathematical Software (TOMS), 22, 469-483, 1996.
Botzem Tim et al., "Tuning Methods for Semiconductir Spin Qubits", Physical Review Applied, vo.. 10, No. 5, 2018.
Chatterjee et al., "Adaptive sparse measurements of high-dimensional Coulomb diamonds", 2020.
Diamond and Boyd, "CVXPY: A Python-embedded modeling language for convex optimization", Journal of Machine Learning Research, 17, 1-5, 2016.
Domahidi et al., "ECOS: An SOCP solver for embedded systems", In European Control Conference (ECC), pp. 3071-3076, 2013.
Li Weijie et al., "Detection of charge states of an InAs nanowire triple qunatum dot with an integrated nanowire charge sensor", Applied Physics Letters, American Institute of Physics, 2 Huntington Quadrangle, Melville, NY 11747, vol. 117, No. 26, 2020.
Noiri Akito et al., "Radio-frequency detected fast charge sensing in udoped silicon quantum dots", Arxiv.org, Cornell University Library, 201 Olin Library Cornell University Ithaca, NY 14853, 2019.
Oakes Giovanni A. et al., "Automatic virtual voltage extraction of a 2×2 array of quantum dots with machine learning", Arxiv.org, Cornell University Library, 201 Olin Library Cornell University Ithacam NY 14853, 2021.
Volk Christian et al., "Fast Charge Sensing of Si/SiGe Quantum Dots via a High-Frequency Accumulation Gate", Nano Letters, vol. 19, No. 8, pp. 5628-5633, 2019.

* cited by examiner

Fig. 1a                    Fig. 1b

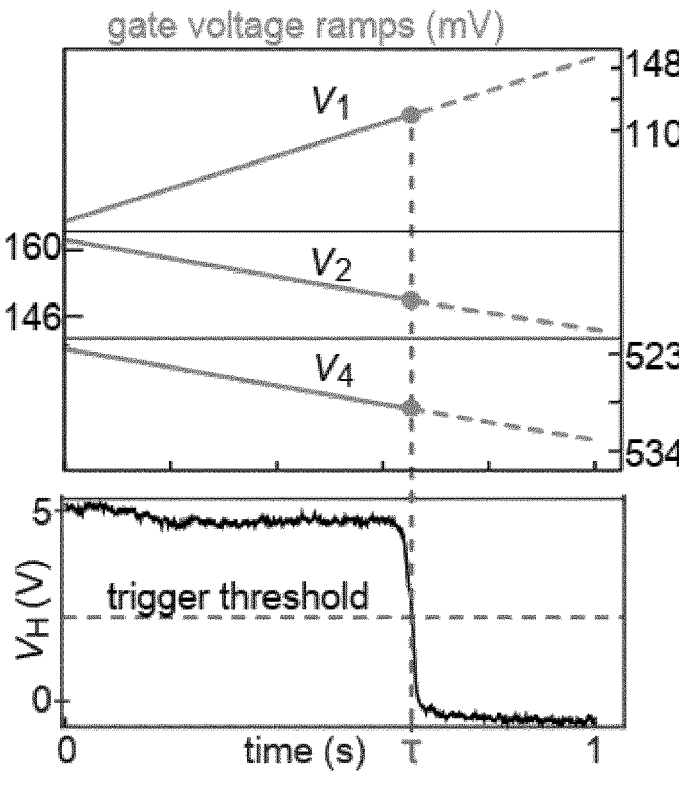
Fig. 1d
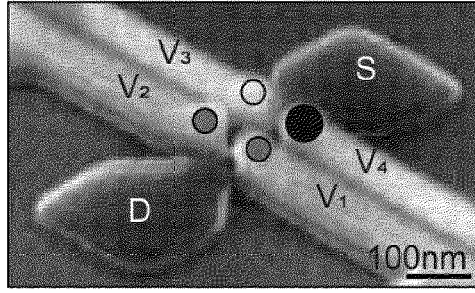
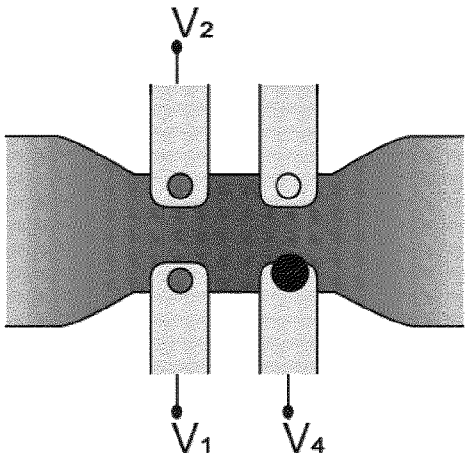
Fig. 1e (1a)

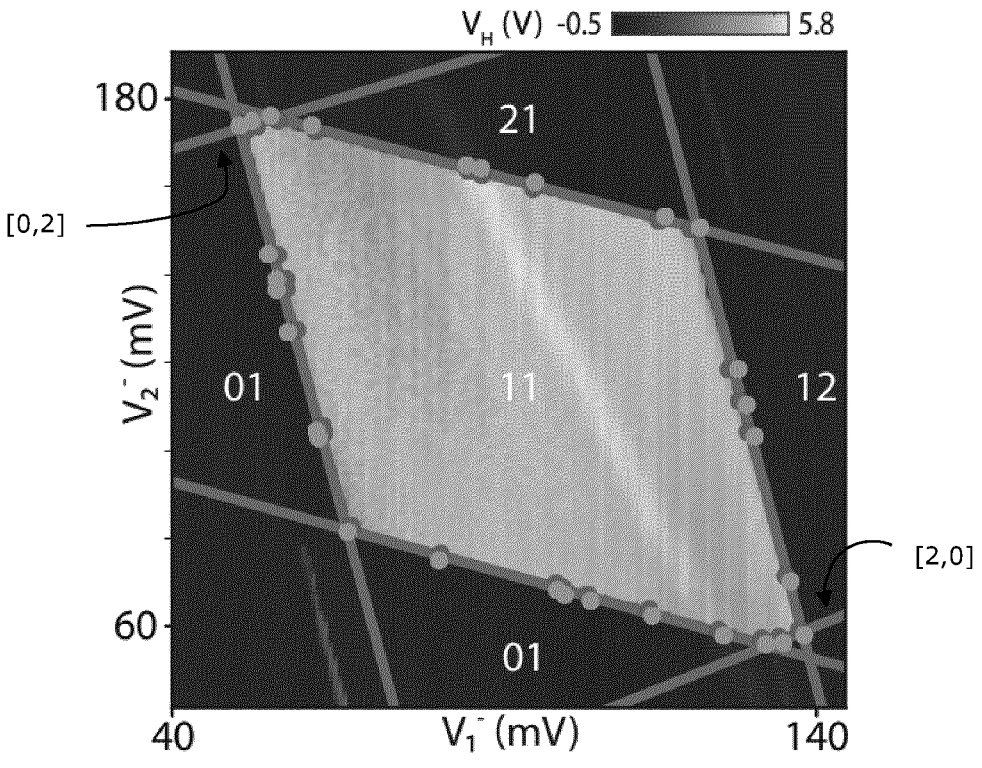
Fig. 4b (similar to Fig. 1b)
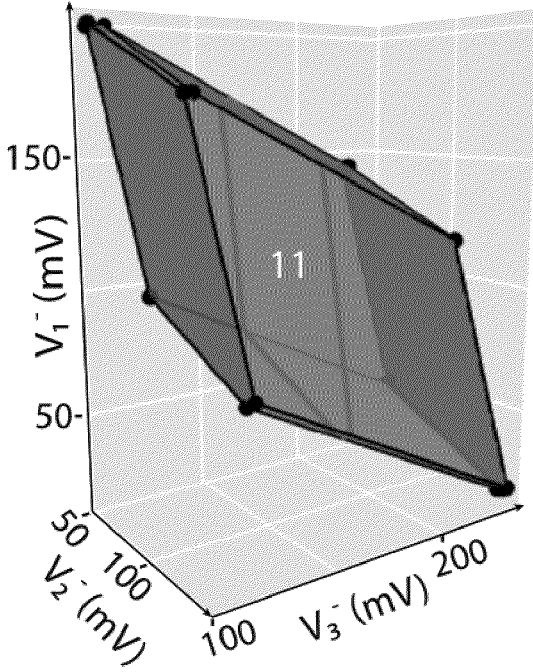
Fig. 4c (similar to Fig. 1c)

METHOD FOR DETERMINING A CHARGE-STATE BOUNDARY OF A QUANTUM DOT, A MULTI-DOT DEVICE, OR AN ARRAY OF QUANTUM DOTS AND A DATA PROCESSING SYSTEM FOR PERFORMING THE METHOD

CROSS REFERENCE TO RELATED APPLICATIONS

This application is the National Stage under 35 U.S.C. § 371 of International Application No. PCT/EP2022/068737, filed Jul. 6, 2022, which claims the benefit of European Patent Application No. 21183956.8 filed on Jul. 6, 2021. The contents of both applications are hereby incorporated by reference herein in their entirety.

FIELD OF INVENTION

The invention relates to a method for determining a charge-state boundary of a single quantum dot, a multi-dot device, or a capacitively-coupled array of quantum dots.

BACKGROUND OF THE INVENTION

Arrays of weakly coupled quantum dots have ground states governed by Coulomb energies, utilized prominently by singly occupied quantum dots that serve effectively as isolated spin qubits. For spin-based quantum processors, the controlled transitions between one ground state to other competing groundstates are of significant operational significance, as these allow movements of quantum information within otherwise empty arrays (single-electron shuttling), or wave function overlap of one spin with another (coherent Heisenberg spin exchange). For few-dot arrays, the ground state regions (Coulomb diamonds) are traditionally identified by performing dense raster-scan measurements in control voltage space, recording for instance the current through a double dot within a two-dimensional voltage cube spanned by its two plunger gate electrodes. For larger dot arrays, this technique becomes impractical, due to the large number of measurements needed to sample the high-dimensional gate-voltage cube, and the comparatively little information (boundaries of Coulomb diamonds) one gains from such dense scans.

Advances in the engineering of high-quality spin qubits have brought the field closer to new bottlenecks along the path to scaling up to weakly-coupled small and intermediate arrays. Among these is the development of techniques to deal with the high-dimensional control-voltage spaces that qubits based on fully-gate-controlled quantum dots are required to navigate. These gates have to be carefully tuned to quickly and reliably find the transitions between ground states which control array loading and unloading as well as wavefunction overlap for qubit operations. Preliminary techniques have been demonstrated for automatically and efficiently tuning quantum dot systems. However, efforts have primarily focused on the development of software algorithms employing artificial intelligence or algorithmic techniques, while the essential paradigm of two-dimensional raster acquisition is maintained. While this has historically been a successful technique for small devices, the increasing number of physical gate electrodes in future two-dimensional arrays increases the dimensionality of control parameter space, where dense sampling is neither conducive (cannot be visualized easily for human assessment) nor time efficient. What is needed are automated and smart navigation algorithms within these high-dimensional voltage spaces that make use of high-bandwidth measurement techniques without needing human intervention and without generating too much data.

A fundamental resource for spin-qubit operations is the existence of large volumes in parameter space (so-called Coulomb diamonds) in which the ground-state occupation of quantum-dot array is well-defined and stable due to Coulomb blockade, as well as identifying the boundaries between one ground-state configuration and another (which we refer to as Coulomb facets). For example, the 11-01 facet of a double dot is useful for resetting the left spin, whereas the 11-02 facet is useful for inducing two qubit rotations (Heisenberg spin-exchange rotations) or for spin-to-charge conversion (qubit readout) (Here, 11 refers to a double dot with one electron in each dot, 01 refers to one electron in the right dot, and zero in the left dot, whereas 02 means that the right dot is double occupied and the left dot is empty). For larger quantum-dot arrays, measuring an entire n-dimensional gate-voltage cube by means of raster scans just to locate operational facets would not be feasible, as it results in a high cost in terms of data storage and in the time wasted in measuring unremarkable, uninformative regions of gate space. In addition, due to the large measurement time, inherent slow drift in the sensor signal common to most semiconductor devices means a measurement of a complete multi-quantum-dot state has to be completed within a few hours, a timescale already much too short for a three-dot system.

For the purpose of this document, "facet" and "charge-state boundary" can be understood to mean the same. With "charge state" of a multi-dot device, we can mean the same as "charge occupation configuration", which is typically specified by the number of electrons or holes in each dot. Example: [1,1,1] or [1 1 1] indicates a triple dot with one carrier (electron or hole) in each dot.

SUMMARY OF THE INVENTION

Considering the prior art described above, it is an object of the present invention to more time-effectively determine the boundaries of a quantum dot, a multi-dot device, or an array of quantum dots.

It is further an object of the present invention to more find all facets of a quantum array.

It is further an object of the present invention to present a method that automatically can find the boundaries and all facets of a quantum dot.

The objects can be achieved by means of a method according to claim 1.

By this method it is possible to acquire information about multi-dot states that may be otherwise inaccessible in reasonable timescales. With denser arrays of quantum dots, the method will be a requirement to quickly initialize and operate the arrays of quantum dots via knowledge of their high dimensional boundaries. Most of this process, including the compensated sensor biasing can be done by a simple algorithm such that it should be able to initialize an array and recognize its charge states purely automatically. By allowing the sample to trigger a measurement at the regions with most information, the risk of expert human intuition restricting itself to regions of known physics is eliminated, with the result that interesting facets, for example those with movement of two or more electrons, in higher dimensions, can be revealed.

The rays can be controlled by two or more ramping gate voltages. With two ramping gate voltages, the boundary of the quantum dot in one plane can be determined.

The rays can be straight or bent.

The quantum dot can be a charge state.

The step of ramping gate voltages can be continuous.

In an embodiment, the rays can be controlled by at least two ramping gate voltages for building up a two-dimensional or higher-dimensional space.

We need at least as many ramping gate voltages as dots in the array. For two dots, two ramping gate voltages can be enough to determine all facets.

Facets in all voltage space dimensions can be found automatically without the need for human intuition. Also hard to find facets can be found.

In an embodiment, an RF signal can be applied on top of a ramping gate voltage creating a reflectometry signal dependent on the charge-state, wherein the time stamp is created by a change in potential of the reflectometry signal.

As the ramping gate voltages increase a ray will move away from the initial point. As the ray crosses the boundary the magnitude of the reflectometry signal will change, which will provide a direct, hardware trigger to any other instrument indicating that the boundary has been passed and detected.

In the present embodiment, a radiofrequency (RF) reflectometry circuit coupled to a sensor can provide a trigger, e.g. a homodyne-detected signal that is sensitive to the charge state of the quantum dot(s). Such a sensor signal sensitive to the charge state(s) of the quantum dot(s) may be generated by other methods. Therefore, other embodiments of detection may include a setup where the sensor is coupled to a microwave cavity instead of a radiofrequency-reflectometry circuit; the transmission of the cavity can then be used as the signal to trigger the time-stamps. In addition, the current through an adjacent sensor may also be used to read out the charge state of the quantum dot(s) if the sensor is sensitive enough to detect the charge state. In principle, any method of measurement distinguishing between the interior of the charge state and the exterior of the charge state with a sufficient on-off ratio may be used to trigger the time-stamped method.

The signal-to-noise ratio (SNR) of the measured signal required to provide a sufficient trigger to discriminate between the interior and exterior of the charge state will vary based on implementation, the quantum system, and the time scale on which detection is desired. Generally, the higher the SNR, the faster the triggered detection can be carried out.

In an embodiment, an RF signal can be capacitively applied to the quantum dot creating a reflectometry signal dependent on the charge-state, wherein the time stamp is created by a change in magnitude of the reflectometry signal. (Alternative to claim 3)

In an embodiment, the step of ramping one of the gate voltages can be discontinued when the associated ray leaves the charge-state and the associated time stamp is created. That will save time.

In an embodiment, for each of at least some rays a pair of gate-voltage values can each define one point inside and one point outside the boundary.

When the method registers that a ray has passed the boundary, the ray is already outside the boundary. The boundary is located between a last measured position of the ray when the rays is inside the boundary and a first measured position of the ray when the rays is outside the boundary. By increasing measuring speed, the distance between the last measured position and the first measured position will decrease and the boundary can be determined more precisely.

In an embodiment, a facet of the boundary can be determined based on at least two or three of the pairs of gate-voltage values, preferably on at least three neighboring pairs of gate-voltage values. (The number of gate-voltage pairs for most efficient determination of the boundary depends on the dimensionality of the boundary, i.e. the dimensionality of the gate-voltage space, and can be optimized depending on the strength of experimental noise.) Since one pair may be positioned so that the last measured position is close to the boundary, while the first measured position is further away from the boundary, and another pair may be positioned so that the last measured position is further away from the boundary, while the first measured position is close to the boundary, there may be very little uncertainty for the location of the facet of the boundary and the boundary can be determined with a high level of precision.

In an embodiment, method can comprise the step of constructing the boundary based on the pairs of gate-voltage values by minimising number of facets.

If further measured pairs of gate-voltage values confirm the minimised number of facets, the minimised number of facets will correspond to the real facets of the quantum dot.

In an embodiment, two facets can be considered the same facet if normals of the two facets are different and form a small angle, for example of less than 20°, preferably less than 15°, most preferably less than 10°. When determining the orientation of facets, there is an uncertainty. It has been discovered that two neighboring facets having normals that form an angle of less than 20° actually form the same facet in some cases, that form an angle of less than 15° actually form the same facet in more cases, and that form an angle of less than 10° actually form the same facet in most cases.

In an embodiment, the method can also comprise the aspect of determining a charge-state boundary of a second charge state, wherein the quantum dot and the second charge state can belong to a quantum dot array comprising quantum dots, wherein the method can comprise any of the steps of adding at least one electron to one of the quantum dots, and/or removing at least one electron from one of the quantum dots, and/or moving at least one electron from one quantum dot to another quantum dot in the quantum dot array, for defining a second initial point inside the second charge state of the quantum dot array, having a charge-state boundary.

By changing the number of electrons in the quantum dot and/or in the second quantum dot and/or in another quantum dot of the initial point from which the plurality of rays in gate voltage space originate, is moved to the second initial point defined inside the charge state of the second quantum dot, so that the charge-state boundary of the second charge state can be determined.

The second charge state can be a second quantum dot.

In an embodiment, the method can comprise the step of repeating the steps of the method as described above, wherein the initial point is replaced by the second initial point.

By repeating the steps of the method as described above based on the second initial point as the initial point at least one charge-state boundary of the second charge state in the quantum dot array can be determined.

The invention also relates to a data processing system comprising a processor configured to perform the steps of the method of any of the claims 1-13, wherein the system comprises a voltage generator for controlling the ramping gate voltages, and a detector for detecting when the rays leave the charge-state/cross the charge-state boundary.

The data processing system can control the voltage generator to control the ramping gate voltages to the correct voltages for directing the rays. The data processing system can create the time stamp when the detector for each of the rays detects that the ray leaves the charge-state/cross the charge-state boundary.

In an embodiment, the voltage generator can be a high-precision voltage generator such as a Digital-to-Analog Converter (DAC) voltage generator and/or the detector can be a voltmeter for measuring the reflectometry signal.

The voltmeter may comprise an amplifier for amplifying the signal for the voltmeter to detect the reflectometry signal. The voltmeter can be a multimeter.

DESCRIPTION OF THE DRAWINGS

The invention will in the following be described in greater detail with reference to the accompanying drawings.

BRIEF DESCRIPTION OF THE DRAWINGS

Figure 1C:
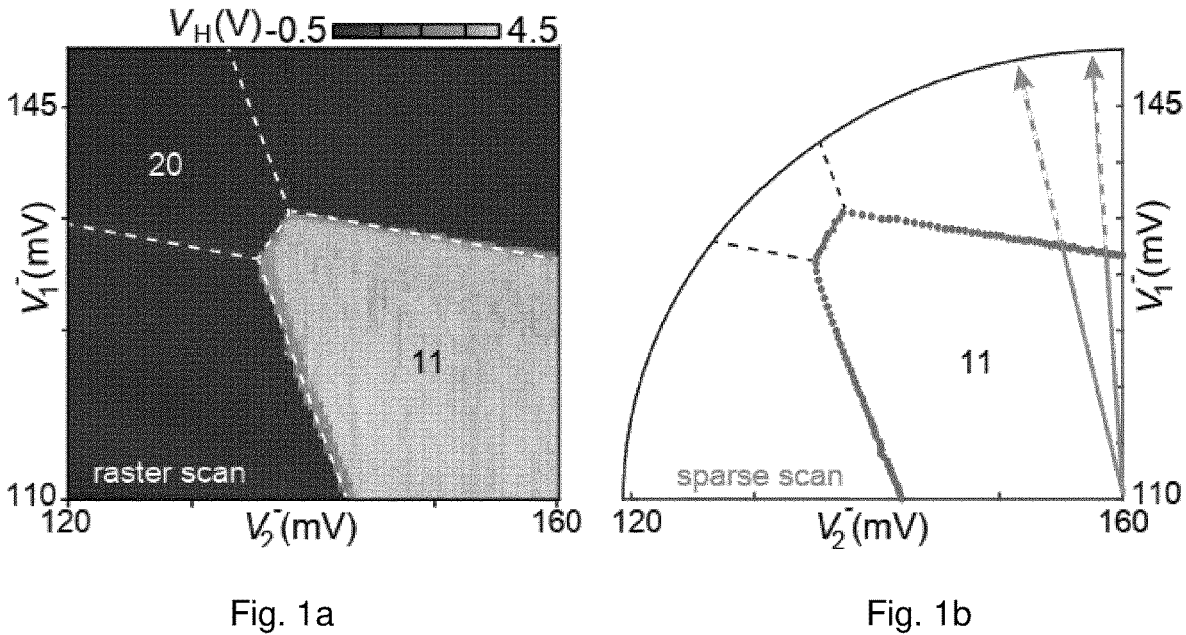
FIG. 1a a schematic view of a raster scan of a double quantum dot showing the two-dimensional charge-state regions 20 and 11, and the one-dimensional facets that bound them.
FIG. 1b a schematic view of the charge-state boundary of the same double quantum dot, wherein the charge-state boundary is acquired by continuously ramped gate voltages, FIG. 1c a schematic view of the set-up, FIG. 1d a schematic view of QDAC voltages and $V_H$ for one exemplary ray in FIG. 1b, FIG. 1e a micrograph and a schematic view of the device, FIG. 2a a schematic view of a simulated Coulomb diamond associated with a generic triple dot, FIG. 2b a schematic view of three distorted hexagons, FIG. 2c the same as FIG. 2b, but where dot 3 is activated instead of dot 2, FIG. 3a a schematic view of a simulated capacitance model of a quadruple dot FIG. 3b schematic views of experimentally measured 2D cuts for five values of $$V_2^-,$$
Figure 1C:
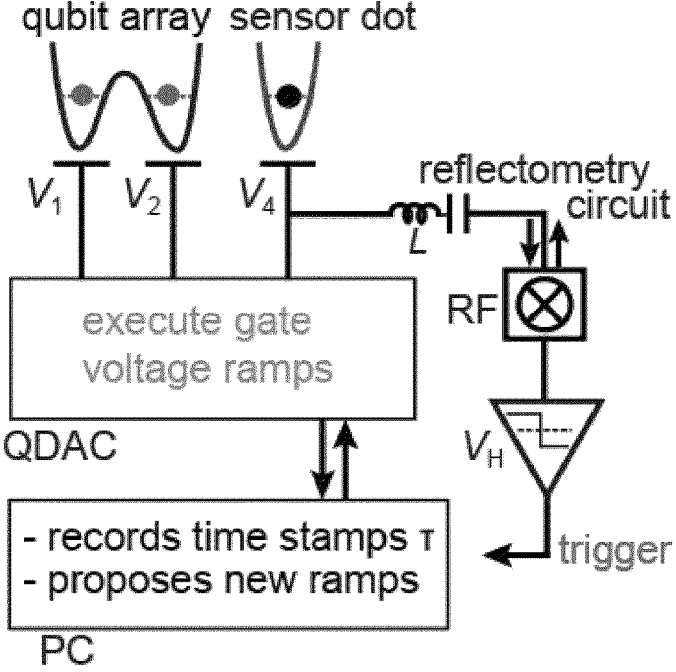

FIG. 1: Principle of sparse acquisition, replacing here a 100×100 raster of measurements by an acquisition of 100 time stamps. For this illustration, a 2×2 quadruple dot was configured as a double dot (dot-1 and dot-2) with capacitively coupled sensor dot (dot-4, monitored by gate-based reflectometry).

FIG. 1a: Typical raster scan (100×100 pixels) of the double quantum dot stability diagram near the 11-20 charge transition, requiring point-by-point gate voltage steps and associated pixel-by-pixel acquisition of $V_H$. At each pixel, three control voltages are set (plunger gate voltages of dot 1,2,4) and one voltage is recorded (homodyne-detected sensor signal $V_H$). For spin-qubit applications, it is only the lower-dimensional boundary of the 11 state (white dashed lines) that contains operational information (such as inducing spin-exchange oscillations at the 11-02 facet).

FIG. 1b: Sparse data acquisition of the same stability diagram using ray-based time stamps. Gate voltages are continuously ramped (not stepped) in three-dimensional gate voltage space (green rays) radially outward from a reference point inside 11, without recording any data. Each of the 100 rays creates one time stamp when leaving the 11 ground state, generated by utilizing $V_H$ as a digital trigger (cf. FIG. 1d). Knowledge of rays and associated time steps then allows reconstruction of the 11 boundary (here 100 red dots).

FIG. 1c: Rays in high-dimensional gate-voltage space are implemented as synchronized ramps on respective QDAC (Quantum Digital-to-Analog Converter) channels, in gate-voltage directions suggested by an adaptive algorithm (cf. FIG. 4a). The QDAC (Qdevil ApS, Copenhagen, Denmark) used is an ultra-stable high-resolution D/A converter for generating computer controlled DC voltage signals. $V_4$ compensates the sensor dot against cross talk from other gate electrodes (see text). Whenever the charge state of the qubit array changes, the demodulated sensor signal $V_H$ changes abruptly, triggering the acquisition of a time stamp until all rays have been executed by the QDAC. For the double dot with sensor dot in FIG. 1b, ray directions are distributed evenly between the initial ray ($V_2$=constant) and the final ray ($V_1$=constant). For the triple dot with sensor dot, ray directions are chosen to span a Fibonacci grid (FIG. 3c) or follow the directions proposed by an active-learning algorithm (FIG. 4c).

FIG. 1d: QDAC voltages (green) and $V_H$ (black) for one exemplary ray in FIG. 1b. For this illustration, $V_H$ was sampled using a digitizing card. For the actual reconstruction in FIG. 1c, $V_H$ is not recorded. Instead, only the time stamps $\tau$ are logged and converted to voltages $V_{1,2,4}$. After a trigger event, the QDAC aborts the remainder of the current ray (green dashed segment) and proceeds with the next.

FIG. 1e: Micrograph of the device. Electrons flowing between source(S) and drain (D) can be trapped by gate induced quantum dots (circles), located below electrostatic gate electrodes $G_{1, \ldots 4}$ and controlled by voltages $V_{1, \ldots 4}$. For the targeted 11 state, each qubit dot (red) contains one electron, whereas the sensor dot (black) is used to generate a high bandwidth sensor signal.

FIG. 2: Effect of dot capacitances and projection on facet shapes. In FIG. 1, the set of yellow pixels can be viewed as the facet of a triple-dot Coulomb diamond, i.e. as a 2D manifold in three-dimensional voltage space.

Figures 2A, 2B:
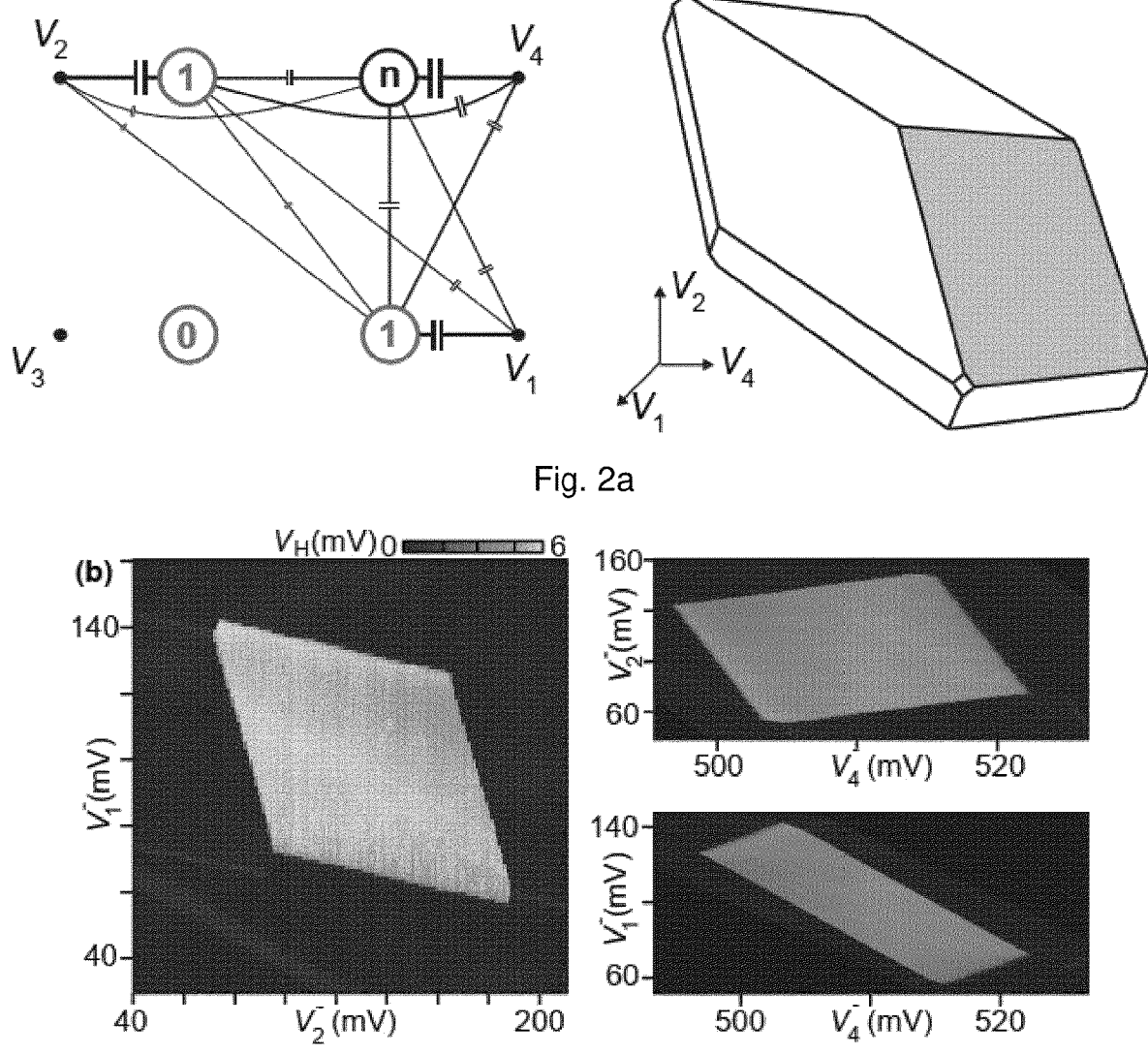

FIG. 2a: Simulated Coulomb diamond associated with a generic triple dot. For this particular choice of capacitances, the facet corresponding to the addition of an electron to dot 2 is tetragonal, whereas facets adding an electron to dot 1 or dot 4 (dot-4 manifold highlighted in yellow) are hexagonal.

FIG. 2b: Measurements of the dot-4 manifold projected onto any pair of $V_{1,2,4}$, revealing three distorted hexagons.

7

Figure 2C:
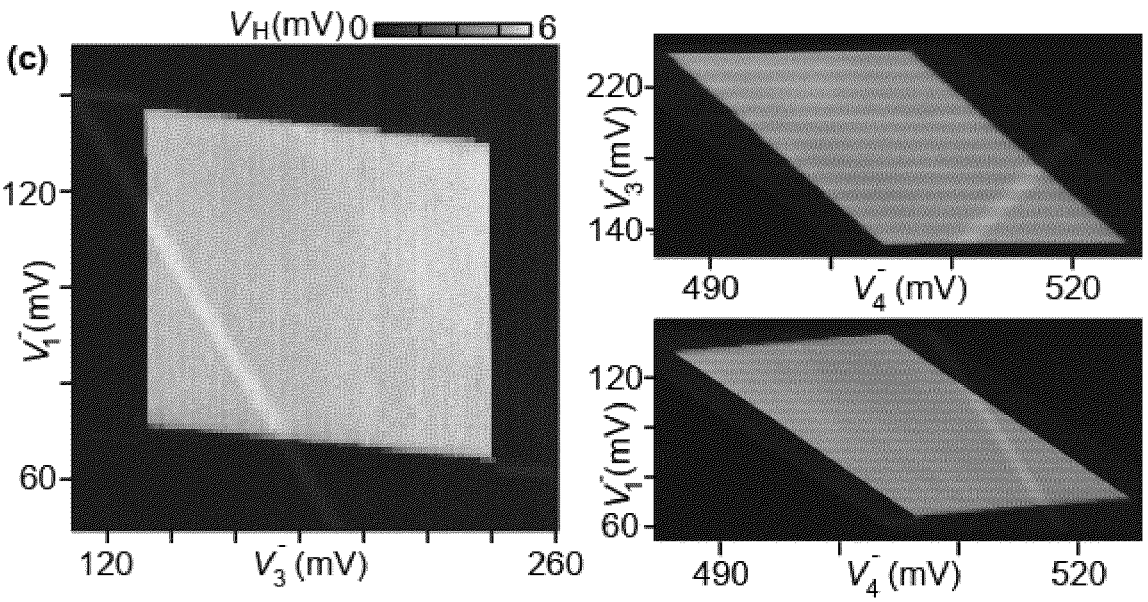

FIG. 2*c*: Same as FIG. 2*b*, but activating dot 3 instead of dot 2 to realize a capacitively distinct triple dot. In this case, the dot-4 facet is a tetragon when projected onto any pair of $V_{1,2,4}$. Generalizing these observations to a quadruple dot, we expect that facets are 3D manifolds in four-dimensional voltage space, and that different facets have different shapes. One such facet, projected to 3D, is shown in FIG. 4*c*.

FIG. 3: Facet of a quadruple-dot Coulomb diamond.

Figure 3A:
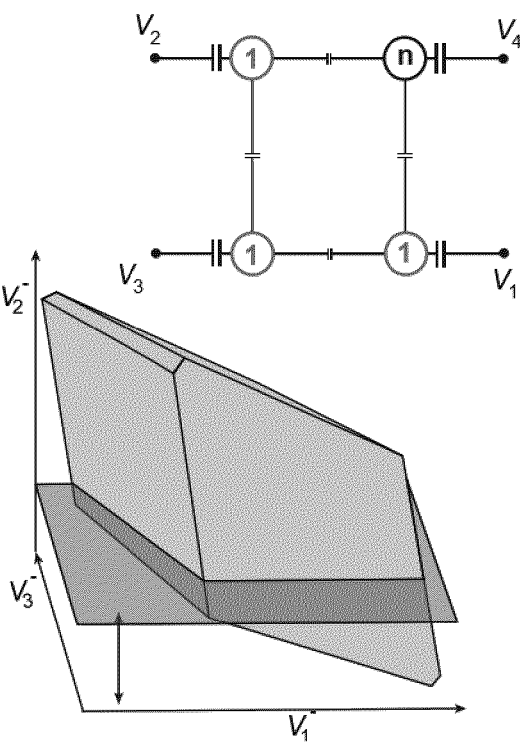
FIG. 3c a view of the same facet as investigated in FIG. 3b, but reconstructed from sparse acquisition along four-dimensional rays, FIG. 4a a schematic view of the algorithmic flow provided an initial point inside the region of interest, FIG. 4b a schematic view of the acquired 2D map of the sensor signal as a function of the control voltages $V_1$ and $V_2$, as well as the facets found by the algorithm (red lines).

FIG. 3*a*: Capacitance model of a quadruple dot. The facet corresponding to the addition of an electron to dot-4 is a 3D manifold in four-dimensional voltage space, projected here onto $$V_{1,2,3}^-$$

(yellow volume). The shape of this manifold can be studied by inspecting 2D planar cuts at fixed values of $$V_2^-.$$

Figure 3B:
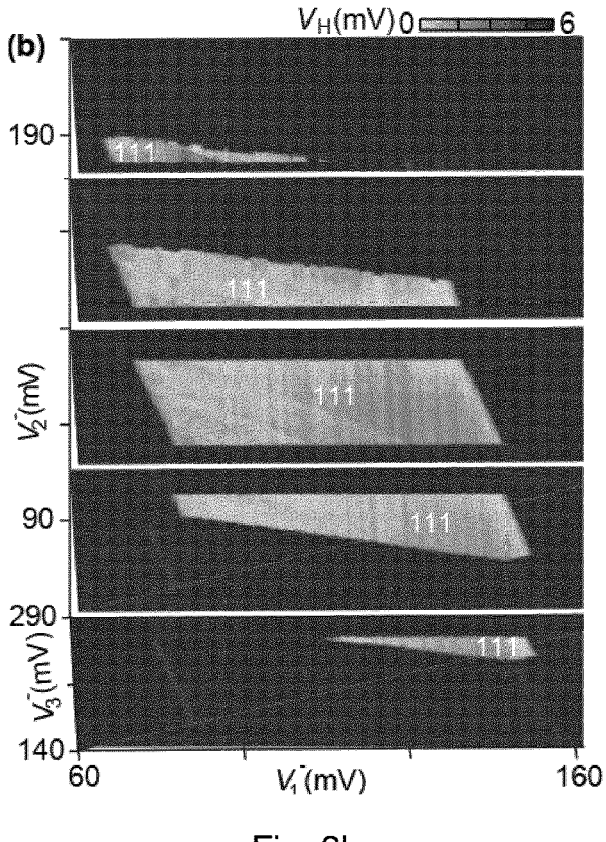

FIG. 3*b*: Experimentally measured 2D cuts for five values of $$V_2^-,$$

illustrating how the cross section changes from trigonal (not shown) to pentagonal to tetragonal.

Figure 3C:
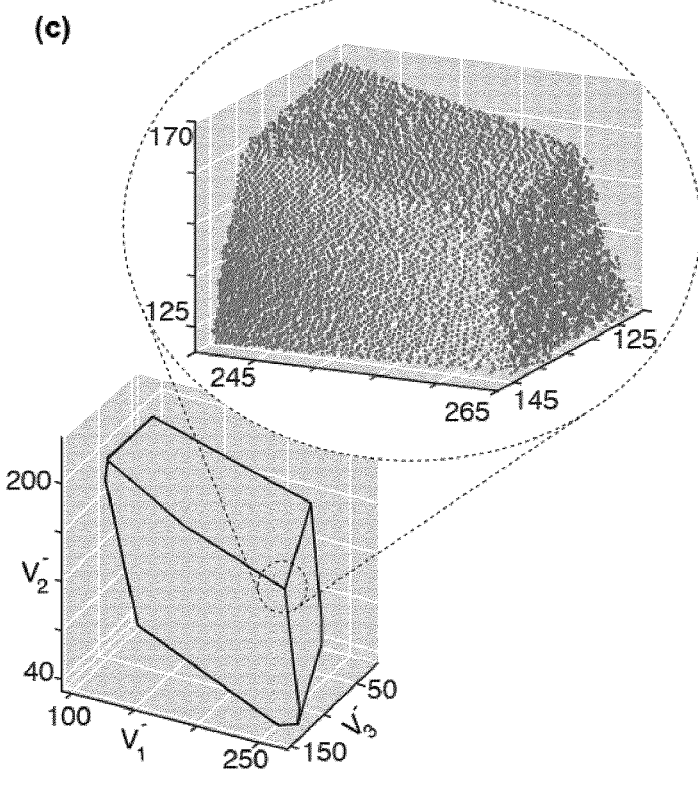
Figure 4A:
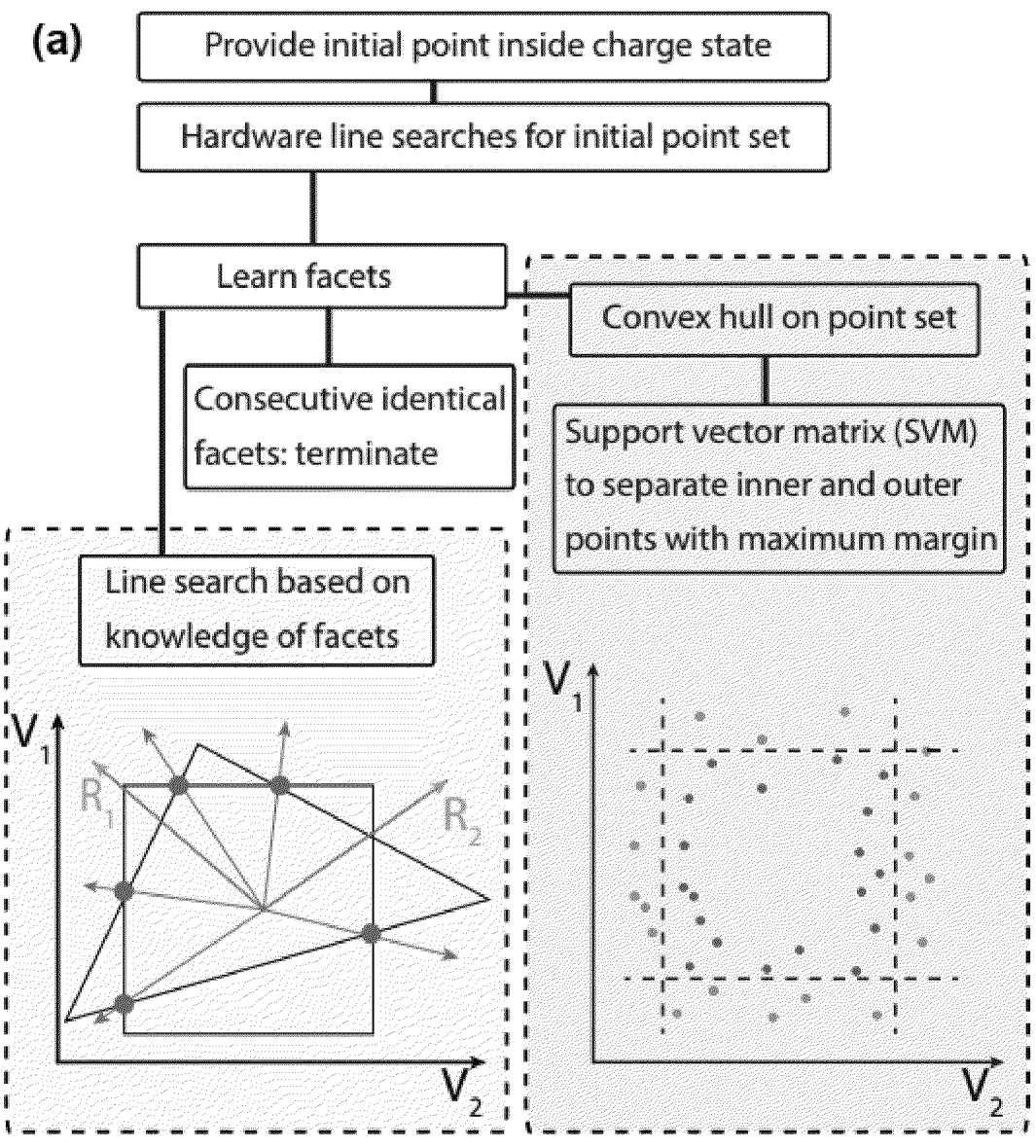
FIG. 4c a view of the charge state facets of the 111 state in three dimensions, as found by the algorithm for an actual quadruple-dot device. Here, the 111 state refers to a triple dot that is capacitively coupled to a fourth dot (sensor dot), i.e. the three-dimensional plot constitutes a 3D projection of the corresponding manifold in four-dimensional gate-voltage space.

FIG. 3*c*: Same facet as investigated in (b), but reconstructed from sparse acquisition along four-dimensional rays. Specifically, the gray volume is the $$V_{1,2,3}^- - \text{projection}$$

of the manifold, reconstructed from 100,000 time stamps. The 3D plot was achieved by performing a Delaunay triangulation of all time stamps, followed by obtaining and plotting their convex hull, i.e., the three-dimensional space bounded by them. The inset shows the density of time steps without this processing.

FIG. 4: Algorithmic search to find facets of interest in two, three, and more dimensions.

FIG. 4*a*: Schematic of the algorithmic flow provided an initial point inside the region of interest. Hardware line searches are performed as described in FIG. 1. Based on randomised initial searches, the algorithm makes a best-guess of charge facets, by performing a convex hull on the point set and using a support vector matrix (SVM) method for learning the boundaries. Subsequent line searches are then programmed based on the knowledge gained about the facets, and the process continues until consecutive searches produce the same boundary, within tolerance (see main text for full description).

FIG. 4*b*: Algorithm carried out on the two dimensional 11 state. Shown is the acquired 2D map of the sensor signal as a function of the control voltages $V_1$ and $V_2$, in high resolution to illustrate the convex polytope of this device configuration. For all yellow pixels, the qubit array is in the [1,1] state. (Whenever $V_{1 \ . \ . \ . \ 3}$ is changed, $V_4$ is not held constant but compensates the sensor dot potential for capacitive cross talk from G1, G2 and G3, see experiments.) Our algorithm estimates state transitions to other states (red lines), based on a small number of point pairs $(x^+, x^-)$ (blue and orange dots) obtained via line searches. Target states of transitions are annotated by [x,y].

FIG. 4*c*: Charge state facets of the 111 state found in three dimensions; ten facets are found.

DETAILED DESCRIPTION OF THE INVENTION

Adaptive low-dimensional scans are used, proposed by software algorithms within a higher-dimensional control voltage space, and we combine this with a hardware triggered detection method based on high-frequency reflectometry, to acquire sparse measurements that directly correspond to transitions between competing ground states within the array. For a 2×2 quantum dot array, these boundaries of Coulomb diamonds (facets) are 3D manifolds in four-dimensional space, which we reconstruct based on our sparse measurement data.

In this work, we present a method that focuses on detection of Coulomb facets (ground-state boundaries) using hardware triggering. High-frequency reflectometry, tuned to be directly sensitive to charge state boundaries, allows sparse measurement triggered by the device, removing the constraint of raster scans and opening up to new algorithmic measurement procedures. By monitoring a high-bandwidth sensor dot via radio-frequency reflectometry in a 2×2 array of silicon quantum dots, we map a property of the sample of interest (a particular ground state, for example) onto the sensor signal. Gate voltages can now be ramped in preset patterns, however, a data point is only acquired when a charge-state boundary is encountered; the sensor signal drops, triggering the acquisition hardware to record the gate values. We illustrate this technique on a double dot, and then demonstrate sparse data acquisition in four-dimensional gate-voltage space to reveal for the first time the facet of a quadruple dot. However, the method of the present disclosure can be used to determine the facets of any dot or any array of dots.

A typical raster scan of a two-dimensional quantum dot stability diagram requires setting the requisite gate voltages step-by-step, and a query and acquisition of the sensor signal for each pixel (see FIG. 1*a*). This rastering results in the acquisition of a great many data points of no added value (bulk of the blue and green regions in FIG. 1*a*, with the added cost of storing this data and interpreting post-hoc by an experienced human researcher. In addition, a significant proportion of "dead time" is added due to communication with instruments controlling gate voltages and reading sensor voltages at each pixel of the raster scan. For spin qubit applications, it is the one-dimensional boundary (white dashed line in FIG. 1*a* that is of interest (for example for inducing exchange oscillations at the 11-02 boundary) as elsewhere dynamics is effectively suppressed by Coulomb charging energies.

In a triggered acquisition as according to the present disclosure, conversely, gate voltages are continuously ramped from within a charge state, in a pattern that can describe a simple polar scan (as used in FIG. 1*b*), or be dictated via some more complex algorithm, instead of point-by-point stepping. No data is recorded at any time, until a charge state boundary is encountered. At this point, the homodyne-demodulated reflectometry signal $V_H$, acting as a digital trigger, forces the recording of a time stamp, after which the QDAC aborts the remaining segment of the current ray (green dashed line) and starts executing the next ray. Once all rays are executed, time stamps are converted to gate voltages and are plotted (red dots in FIG. 1b). Instead of the QDAC (by QDevil ApS, Denmark), other voltage generators and digital-to-analog converters can also be considered for generating the voltage ramps.

The device used for the current demonstration consists of a silicon-on-insulator (SOI) chip, with a channel consisting of an undoped silicon nanowire (width, W=70 nm and thickness, $t_{Si}$=7 nm) connected to highly doped source(S) and drain (D) contacts. A 2×2 array of four electrostatically defined quantum dots are formed under four accumulation gates ($G_{1-4}$, gate length $L_G$=32 nm, vertical $S_V$ and horizontal $S_H$ spacings are 32 nm). The device is described in more detail in Ansaloni et al. Nature Communications 11 (2020) 6399.

An RF-reflectometry probe tone is applied to gate $G_4$ and the signal reflected from the RF tank circuit is homodyne detected at room temperature, resulting in the demodulated voltage $V_H$. This voltage is amplified and is fed into the trigger input of an Agilent 35440A digital multimeter (Agilent; Santa Clara, California, the USA). Other multimeters could also be considered for measuring the voltage $V_H$. The distinction between the state boundaries is achieved by operating the sensor dot (i.e. $V_4$) in a compensated manner in which changes in $$V_{1,2,3}^-$$

do not affect the chemical potential of dot 4. Within a charge state, the sensor signal is then independent of the other gate voltages, but changes abruptly whenever an electron movement occurs in the array, i.e. whenever a ground-state to ground-state transition is encountered. With suitable amplification, the sensor demodulated voltage then triggers the multimeter, which stores a timestamp in its memory, and the next ramp is started.

For illustrative purposes, we first tune the device such that a double quantum dot in the single-electron regime is formed in the two quantum dots facing each other under the device gates $G_1$ and $G_2$. Gate ramps are applied to gates $G_{1-2}$ (as well as a compensatory ramp on $G_4$) to navigate in the two-dimensional gate space.

However, in order to explore these higher-dimensional facets, raster scans come up short. In two dimensions, the shape of the interdot facets of the 11 state are well known, and raster scans are not appreciably costly. In three dimensions, acquisition of the entire charge-state boundary is already prohibitively time consuming, such that triple-dot qubits are commonly operated by taking 2D raster scans i.e. "slices" in the larger gate space, relying on human intuition. FIG. 4 shows the quantum dot array tuned as a quadruple dot array under gates $G_{1,2,3,4}$. FIG. 4a illustrates one particular facet of the 4D Coulomb diamond, corresponding to the addition of an electron to dot 4, by omitting $V_4$ coordinate of the manifold and simply plotting the projection onto $V_1$, $V_2$ and $V_3$.

Next, two-dimensional scans at selected values of $G_2$ are measured in traditional raster mode, to illustrate the shape of the three-dimensional state and the changes in the number of facets as $V_2$ is increased, from a trigonal to a pentagonal, and finally to a tetragonal shape. We note that each of these scans takes 10 minutes, such that the full state would take 83 hours to measure, during which slow sensor drifts may further complicate measurements unless devices are perfectly stable.

FIG. 4c shows the same manifold as explored in FIG. 4b, but measured using the sparse, triggered acquisition technique, and reconstructed from 100,000 time stamps. A Fibonacci grid is used to distribute points in a uniform manner in three dimensional polar coordinates associated with $$V_1^1, V_2^1, \text{ and } V_3^1.$$

Once acquired, a Delaunay triangulation is performed on these points in the space spanned by $$V_1^1, V_2^1, \text{ and } V_3^1,$$

and their convex hull (i.e. the three-dimensional space bounded by them, corresponding to the 111 charge state) is obtained and plotted. The inset shows the raw data in the form of the time-stamps, converted to gate voltage, previous to the convex hull being taken.

A primary application of the technique, as illustrated in FIG. 4c, is to acquire information about multi-dot states that may be otherwise inaccessible in reasonable timescales. In addition, as denser arrays of quantum dots are fabricated, it will become imperative to quickly initialize and operate them via knowledge of their high dimensional boundaries. Most of this process, including the compensated sensor biasing can be done by a simple algorithm such that it should be able to initialize an array and recognize its charge states purely automatically. In addition, with this faster technique of line-searches, especially taking advantage of higher bandwidth ramps, automatic recognition of facets and automated tune-up of small-scale dot arrays could become much more accessible. Finally, by allowing the sample to trigger a measurement at the regions with most information, the risk of expert human intuition restricting itself to regions of known physics is eliminated, with the result that interesting facets, for example those with movement of two or more electrons, in higher dimensions, can be revealed.

The Algorithm

This section deals with the problem of controlling the electron transitions between quantum dot locations. Instead of having all search directions (ramps) be pre-defined by a human being prior to measurements (such as the Fibonnaci grid used for acquisition if FIG. 3c), we now allow search directions to be proposed adaptively by the computer, taking into account information that the algorithm learns along the way and thereby making out methods even more efficient. Specifically, we present an algorithm that is capable of discovering the set of possible electron transitions as well as their correct control parameters and demonstrate its performance on a real device. Our algorithm is based on a connection to computational geometry and phrases the optimization problem as estimating the facets of a convex polytope from measurements. While this problem is NP-hard, an approximated solution performs well and thus our algorithm represents the first practical automatic tuning algorithm which has the prospects to be scaled to more than 2 or 3 quantum dots on real devices. We demonstrate its practicality on a simulated device with four quantum dots as well as a real device with four quantum dots (three qubit dots plus one sensor dot), which is already outside the scope of human tuning capabilities. Our contributions are the following:

1 We develop an algorithm that aims to find a sparse approximate solution of a convex polytope from measurements with as little facets as possible.

2 We show applicability of our algorithm on a real quantum dot array, specifically a foundry-fabricated silicon device that is currently being developed for spin qubit applications.

In our algorithm we use line searches to obtain a dataset, which we iteratively improve upon. We combine this with a model of the polytope which learns individual state transitions. The algorithm makes use of our proposed invention to implement a line-search, which locates a state transition in control parameter space. The line search brackets the position of a state transition by pairs of control parameters ($x^+$, $x^-$), each defining one point inside and outside of the (unknown) polytope. This allows for high precision measurements and locates the boundary within a margin of $\delta = \|x^+ - x^-\|$, which is a tuneable parameter, chosen based on the trade-off between line search precision and measurement time.

Our algorithm starts with an initial set of randomly selected point pairs gathered by line-searches in random direction. It fits an initial polytope to the data and then performs a line search in the directions of the corners and through each facet of the polytope. If our polytope is correct, all state transitions of our model will be contained between the pairs ($x^+$, $x^-$) of the performed line searches. Otherwise, we obtain examples of new points which we can add to our dataset and fit a new convex polytope. This process is repeated until we either run out of computation time or all performed line searches are correct.

Finding the new points in each iteration is a well-known problem and can be implemented by solving the halfspace intersection problem, which finds all vertices. Points on a facet can be constructed via linear interpolation of the obtained vertex points that lie on the facet. For fitting the polytope we use a large-margin approach for finding a set of linear boundaries that separate the points inside from the points outside. Starting with a convex polytope over the collected points inside the facet x−, we iteratively assign points x+ (which are outside the polytope) to their closest boundary and then in turn use the assignments to compute the boundaries that best separate the assigned points from all x−. We prune boundaries that are not assigned any points and repeat this process until the assignments of points to boundaries does not change anymore. After this is done, we add noise to the solution and repeatedly solve again in order to find different potential solutions. From all solutions found we take the one that separates the points best. To fit the boundaries, we use a variant of the support-vector machine, but any linear classification algorithm can be used to find the optimal boundaries given the assigned set of points.

Example

We implemented our algorithm with cvxpy (Diamond and Boyd, 2016; Agrawal et al., 2018) using the ECOS solver for SOCP problems (Domahidi et al., 2013). We compute halfspace intersections, convex hulls and their volumes using the Qhull library (Barber et al., 1996). To save computation time, we include new point pairs ($x^-$,$x^+$) into the training dataset only if it does not already contain any pair with $\|x^+ - x^-\| < \epsilon_{close}$. The algorithm terminates, when the distance between the sampled points to the boundary of the polytope is smaller than $\epsilon_{end}$. To assess the performance of our algorithms, we compared our approach, where possible, to an algorithm that has perfect information regarding which point pair is cut by which hyperplane. For this, we additionally compute the state $s_i$ of $$x_i^+,$$

pick $\hat{N}$ as the number of different observed states and solve (7) using the obtained $s_i$. This way, the problem becomes convex and can be solved efficiently. We refer to this algorithm as our baseline.

Reference is made to the device discussed previously in FIG. 1e, which can create up to four quantum dots. In an example (see FIG. 4b and its discussion below), our algorithm is applied to a state with dot 1 and dot 2 each occupied by one electron, and the two gate voltage parameters $V_1$ and $V_2$ are used to control this [1,1] configuration. (Dot 3 is kept empty by keeping $V_3$ fixed at a sufficiently negative voltage, and dot-4 serves as a sensor dot controlled by voltage $V_4$). This demonstration is repeated by another, higher-dimensional example, where the same device is tuned such that an electron occupies the dot under $G_3$ as well (i.e. the three qubit dots dot-1, dot-2, dot-3 are all active and coupled to dot-4, which serves as a sensor dot). Here, the algorithm estimates the polytope associated with the [1,1,1] state of dot-1, dot-2, dot-3, using the three respective gate voltage parameters $V_1$, $V_2$, $V_3$.

For the real device, we implemented a line search in hardware using a voltage generator (QDAC by QDevil ApS, Denmark, but other voltage-generators could also be considered). Instead of using the single point $x_i$ returned by the hardware, we add a confidence interval $$x_i^{\pm} = x_i \pm \frac{\delta}{2}$$

with $\delta = 0.001$, which takes into account the inherent measurement uncertainty. This choice of $\delta$ is equivalent to the $\delta = 0.1$ setting in the simulated device on the re-scaled parameters. Further, we pick $\sigma = 0.05/\delta$ and $C = 10/\delta$. The initial dataset was obtained via line searches using 10 random directions.

Results

For the real device, the obtained model of our algorithm is shown in FIG. 4b by lines depicted in red color. In 2D, human experts verified the correctness of the state transitions and annotated the resulting states, based on a dense 2D raster scan shown in the background of FIG. 4b. We can see that the algorithm even found two very small facets which are invisible on the raster scan. In 3D no ground truth is available, but qualitatively the 10 facets found by the algorithm (six large ones and two pairs of thin slabs in FIG. 4c) are in line with how the experts understand this device: The 6 large transitions correspond to adding or removing one electron from each qubit dot, whereas the two pairs of smaller facets correspond to moving an electron between dot 1 and dot 2, or between dot 2 and dot 3.

The run time of the algorithm for the real device (including line searches) was less than a minute for two dots and 30 minutes for three dots (15 minutes measurement time for 180 line searches).

An example of the superiority of our approach to rastering can be seen in FIG. 4*b*. Here, we can see that the algorithm managed to find two very small facets (labeled [0,2] and [2,0]) which are invisible on the raster scan. Operationally, these are two very important facets in the device as they amount to transitions of electrons between quantum dots, while the other transitions are electrons entering or leaving the array. For the purposes of quantum computation, such inter-dot tunneling processes effectively turn on wave-function overlap between two electrons, which is a key resource to manipulate their spin states via Heisenberg exchange coupling. The same holds for the 3D polytope estimated in FIG. 4*c*, where small facets corresponding to inter-dot transitions have been found.

References

The references mentioned above are:

Diamond and Boyd, 2016: CVXPY: A Python-embedded modeling language for convex optimization. Journal of Machine Learning Research, 17 (2016) 1-5.

Agrawal et al., 2018: A rewriting system for convex optimization problems. Journal of Control and Decision, 5 (2018) 42-60.

Domahidi et al., 2013: ECOS: An SOCP solver for embedded systems. In European Control Conference (ECC), (2013) pages 3071-3076.

Barber et al., 1996: The quickhull algorithm for convex hulls. ACM Transactions on Mathematical Software (TOMS), 22 (1996) 469-483.

The invention claimed is:

1. A method for determining a charge-state boundary of a quantum dot, a multi-dot device, or an array of quantum dots, comprising:

defining an initial point inside a charge state of a quantum dot having a charge-state boundary, ramping gate voltages from the initial point thereby creating a plurality of rays in gate voltage space, creating a time stamp when each of the rays leave the charge-state or cross the charge-state boundary by obtaining a sensor signal acting as a digital trigger that prompts the creation of said time stamp, and constructing the boundary of the charge state by correlating each ray in the gate voltage space with the associated time stamp.

2. The method according to claim 1, wherein the rays are controlled by at least two ramping gate voltages for building up a two-dimensional or higher-dimensional space.

3. The method according to claim 1, wherein an RF signal is applied on top of a ramping gate voltage creating a reflectometry signal dependent on the charge-state, wherein the time stamp is created by a change in potential of the reflectometry signal.

4. The method according to claim 1, wherein an RF signal is capacitively applied to the quantum dot creating a reflectometry signal dependent on the charge-state, wherein the time stamp is created by a change in potential of the reflectometry signal.

5. The method according to claim 1, wherein ramping one of the gate voltages is discontinued when the associated ray leaves the charge-state and the associated time stamp is created.

6. The method according to claim 1, wherein for each of at least some rays a pair of gate-voltage values each defining one point inside and one point outside the boundary.

7. The method according to claim 6, wherein a facet of the boundary is determined based on at least three of the pairs of gate-voltage values.

8. The method according to claim 6, wherein the method comprises constructing the boundary based on the pairs of gate-voltage values by minimizing a number of facets.

9. The method according to claim 6, wherein two facets are considered the same facet if normals of the two facets are different and form an angle of less than 20°.

10. The method according to claim 6, wherein two facets are considered the same facet if normals of the two facets are different and form an angle of less than 15°.

11. The method according to claim 6, wherein two facets are considered the same facet if normals of the two facets are different and form an angle of less than 10°.

12. The method according to claim 1 for determining a charge-state boundary of a second charge state, wherein the quantum dot and the second charge state belong to a quantum dot array comprising quantum dots, wherein the method comprises any of:

adding at least one electron to one of the quantum dots, and/or removing at least one electron from one of the quantum dots, and/or moving at least one electron from one quantum dot to another quantum dot in the quantum dot array, for defining a second initial point inside the second charge state of the quantum dot array, having a charge-state boundary.

13. The method according to claim 12, further comprising repeating the defining, ramping, creating, and constructing steps, wherein the initial point is replaced by the second initial point.

14. A data processing system comprising:

a processor configured to:

define an initial point inside a charge state of a quantum dot having a charge-state boundary, ramp gate voltages from the initial point thereby creating a plurality of rays in gate voltage space, create a time stamp when each of the rays leave the charge-state or cross the charge-state boundary by obtaining a sensor signal acting as a digital trigger that prompts the creation of said time stamp, and construct the boundary of the charge state by correlating each ray in the gate voltage space with the associated time stamp, a voltage generator for controlling the ramping gate voltages, and a detector for detecting when the rays leave the charge-state or cross the charge-state boundary.

15. The data processing system according to claim 14, wherein the voltage generator is a DAC voltage generator and/or the detector is a voltmeter for measuring the reflectometry signal.

* * * * *